United States Patent [19]
Remy

[11] 3,903,165
[45] Sept. 2, 1975

[54] ETHYNYLARYL AMINES AND PROCESSES FOR THEIR PREPARATION
[75] Inventor: David C. Remy, North Wales, Pa.
[73] Assignee: Merck & Co., Inc., Rahway, N.J.
[22] Filed: Aug. 19, 1974
[21] Appl. No.: 498,829

[52] U.S. Cl. ... 260/570.5 CA; 260/668 R; 260/247; 260/326.87; 260/243 R; 260/251 R
[51] Int. Cl.$^2$ ............ C07C 91/16; C07D 295/02; C07D 207/06
[58] Field of Search .............. 260/570.5 CA, 668 R

[56] References Cited
UNITED STATES PATENTS

| | | | |
|---|---|---|---|
| 3,050,559 | 8/1962 | Burger | 260/570.5 CA |
| 3,207,785 | 9/1965 | Kaiser et al. | 260/570.5 CA X |
| 3,532,749 | 10/1970 | Biel et al. | 260/570.5 CA X |
| 3,646,146 | 2/1972 | Teotino et al. | 260/570.5 CA X |
| 3,719,712 | 3/1973 | Remy | 260/570.9 |

FOREIGN PATENTS OR APPLICATIONS 973,887  10/1964  United Kingdom ....... 260/570.5 CA Primary Examiner—Allen B. Curtis
Attorney, Agent, or Firm—Daniel T. Szura; J. Jerome Behan

[57] ABSTRACT

This application discloses arylethynylphenylcyclopropylamines and processes for their preparation. These amines exhibit monoamine oxidase (MAO) inhibiting activity.

13 Claims, No Drawings

ETHYNYLARYL AMINES AND PROCESSES FOR THEIR PREPARATION

BACKGROUND OF THE INVENTION:

This invention relates to arylethynylarylcyclopropylamines, their method of preparation and pharmaceutical use.

Arylethynylaralkylamines of the general formula

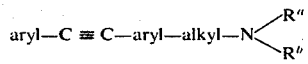

where alkyl is linear or branched hydrocarbyl and/or $R^a$ and $R^b$ are hydrogen or other substituents are disclosed in U.S. Pat. No. 3,719,712 and pending U.S. application Ser. No. 216,264 now U.S. Pat. No. 3,882,130. This class of compounds exhibits substantial anti-arrhythmic activity.

The present invention concerns novel cyclopropylamines having the general formula

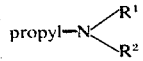

where $R^1$ and $R^2$ are hydrogen or other substituents. These novel compounds have activity as monoamine oxidase inhibitors. Inhibition of monoamine oxidase is an activity useful in the treatment of mental depression.

SUMMARY OF THE INVENTION

Compounds having the formula:

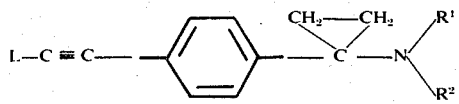

wherein L is aryl, preferably phenyl and $R^1$ and $R^2$ are various substituents, preferably hydrogen; and nontoxic pharmaceutically acceptable salts thereof; methods for preparing these compounds, and use as monoamine oxidase inhibitors.

DESCRIPTION OF THE PREFERRED EMBODIMENTS:

The present invention is embodied broadly in compounds which are 1,2-diaryl derivatives of acetylene wherein one of the aryl substituents is an aromatic ring having at least one of its hydrogens replaced by an aminocyclopropyl radical, and in which the other aryl substituent includes unsubstituted homocyclic or heterocyclic aryl groups and substituted homocyclic and heterocyclic aryl groups.

A preferred class of compounds of the present invention are susbstituted cyclopropylamines having the formula:

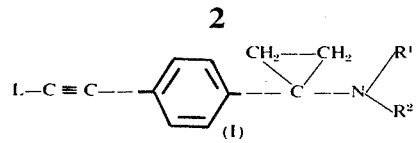

wherein L is aryl, and $R^1$ and $R^2$ (1) when separate, are independently selected from hydrogen, alkyl and alkenyl, cycloalkyl, perfluoroalkyl, aryl, acyl, and formyl, and (2) when joined are a 5-6 membered heterocyclic group.

Formula I compounds includes those in which L is biphenylyl, napthyl, indanyl, indenyl, phenyl or substituted phenyl having one or more, preferably one to three substituents selected from the group consisting of an alkyl having up to 6 carbon atoms, an alkenyl group having up to 6 carbon atoms, a perfluoroalkyl group having up to 4 carbon atoms, a phenyl or a substituted phenyl radical, a dialkylamino group having up to 8 carbon atoms, an alkylsulfonylamino group having up to 4 carbon atoms, hydroxyl, an alkoxy group having up to 4 carbon atoms, mercapto, an alkylmercapto group having up to 4 carbon atoms or a halogen such as fluoro, chloro, bromo or iodo and $R^1$ and $R^2$ are separate.

An especially preferred group of compounds of the invention are those having the formula:

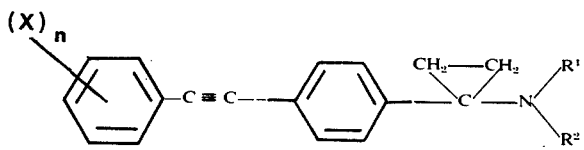

wherein X is selected from halogen, including Cl, I Br and F, hydrogen, lower alkoxy of 1–4 carbons, preferably methoxy, lower alkyl of from 1–4 carbons, preferably methyl, hydroxy, phenyl, alkyl, mercapto, alkyl sulfonyl, sulfamoyl, and trifluoromethyl; $n$ is 1 or 2 and $R^1$ and $R^2$ are independently selected from hydrogen and lower alkyl substituents having from 1 to 6 carbon atoms, preferably 1 to 4 carbon atoms, and methyl most preferably; and pharmaceutically acceptable salts thereof.

Still more preferred compounds of the present invention are those having the formula:

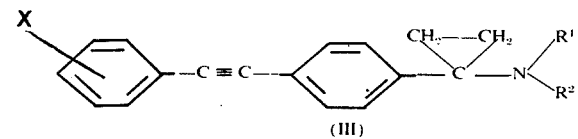

wherein X is selected from halogen including Cl, F I and Br, —CF₃, C₁-C₄ alkyl, C₁-C₄ alkoxy, and phenyl and R¹ and R² are independently selected from hydrogen and C₁-C₃ alkyl; and pharmaceutically acceptable salts thereof. Most preferred compounds are 1-[4-(phenylethynyl)phenyl]cyclopropylamine having the formula:

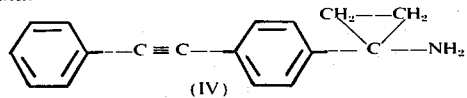

(IV)

and non-toxic, pharmaceutically acceptable salts thereof.

Illustrative of the compounds of the present invention are

1-[4-(biphenylylethynyl)phenyl]cyclopropylamine;
1-[4-(p-tolylethynyl)phenyl]cyclopropylamine;
1-[4-(2-methoxyphenylethynyl)phenyl]cyclopropyl-N-methylamine;
1-[4-(3-fluorophenylethynyl)phenyl]cyclopropyl-morpholine

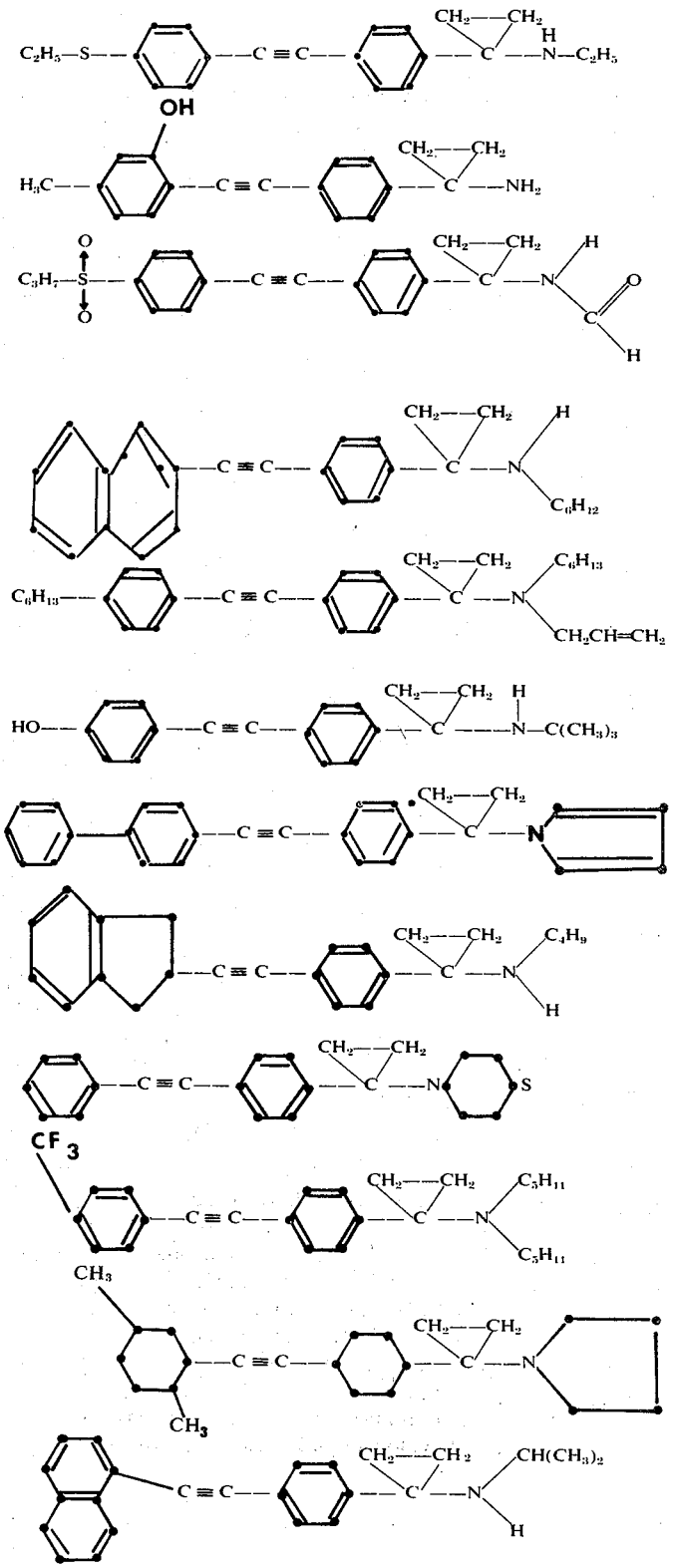

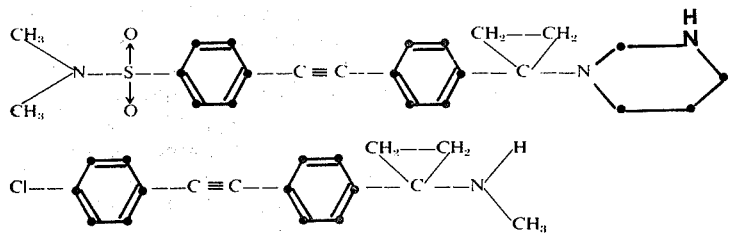

1-[4-(phenylethynyl)phenyl]cyclopropyl-N,N-di-t-butylamine;
1-[4(3-iodophenylethynyl)phenyl]-cyclopropylamine;
1-[4(3,5-dibromophenylethynyl)phenyl]cyclopropyl-N-propylamine;
1-[4-(4-cyclohexylphenylethynyl)phenyl]cyclopropyl-N-cyclopropylamine;
1-[4-(phenylethynyl)phenyl]cyclopropyl-N-hexylamine and the like; and their non-toxic pharmaceutically acceptable salts.

The non-toxic pharmaceutically acceptable salts of the present amines are generally the acid addition salts. They are prepared by reacting the amine compound with sufficient acid to neutralize at least one, and preferably all the basic nitrogens in said amine. Useful salts are those of the present cyclopropyl amine and an inorganic acid or an organic acid. Useful inorganic acids are the hydrohalo acids such as HCl and HBr, sulfuric acid, phosphoric acid, and the like. Useful organic acids are those such as sorbic acid, citric acid, 1 malic acid, maleic acid, tartaric acid, lactic acid, propionic acid, succinic acid, adipic acid and the like Examples of useful salts are 1-[4-(phenylethynyl)phenyl]cyclopropylamine hydrochloride
1-[4-(p-tolylethynyl)phenyl]cyclopropyl-N-methylamine hydrogen maleate
1-[4-(o-bromophenylethynyl)phenyl]cyclopropylamine succinate
1-[4-(β-naphthylethynyl)phenyl]cyclopropyl-N-amyl dihydrogenphosphate and the like.

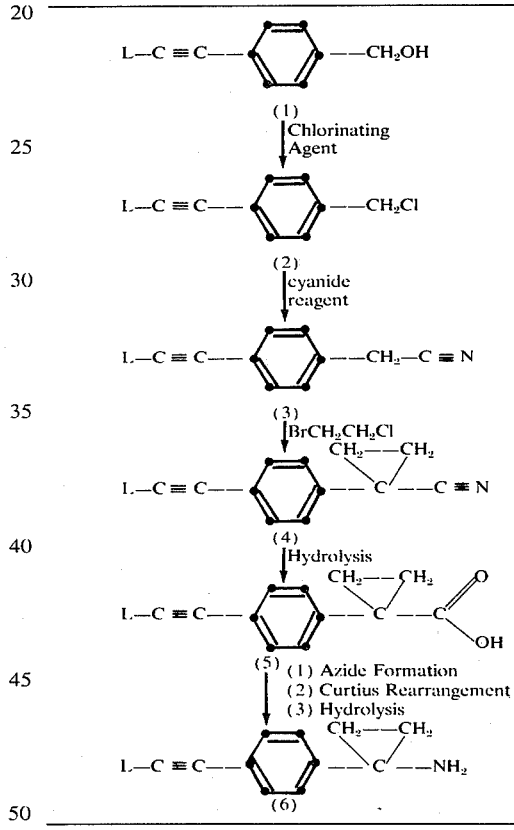

REACTION SEQUENCE A

The final product (6) can be converted to corresponding N-substituted or N,N-disubstituted compounds by any applicable reaction.

The following example illustrates, but does not limit, the process of Sequence A.

EXAMPLE 1

A. 4-(Phenylethynyl)phenylacetonitrile

To a solution of 6.0 g. (0.0288 mole) of 4-(phenylethynyl)benzyl alcohol in 100 ml. of chloroform is added dropwise 7 ml. of thionyl chloride. The solution is stirred at room temperature for 6 hours. Evaporation of the solvents leaves a solid that is sublimed at 65° (0.05 mm.) to give 6.0 g. (92%) of 4-(phenylethynyl)benzyl chloride, m.p. 61.5°–63.5°.

Anal. Calcd. for $C_{15}H_{11}Cl$: C, 79.47; H, 4.89. Found: C, 79.60; H 4.98.

A mixture of 3.72 g. (0.076 mole) of sodium cyanide in 30 ml. of dry dimethylsulfoxide is heated to 90°–95°. On cooling to 35°, the mixturee forms a gelatious mass that is stirred manually while 8.0 g. (0.0354 mole) of the above chloride is added. The mixture is stirred overnight and is poured into 400 ml. of water. The precipitate is collected, dissolved in benzene, washed with water, dried over magnesium sulfate, and the solvent removed. The residue is recrystallized from cyclohexane to yield 13.25 g. (88%) of 4-(phenylethynyl)phenylacetonitrile, m.p. 76°–70°. An analytical sample is prepared by sublimation at 80° (0.05 mm), m.p. 78°–80°.

Anal. Calcd. for $C_{16}H_{11}N$:C, 88.45; H,5.10; N,6.45. Found: C, 88.76; H, 5.10; N, 6.31.

B. 1-[4-(Phenylethynyl)phenyl]cyclopropane carbonitrile

Sodamide, prepared from 0.46 g. (0.02 g. — atom) of sodium and suspensed in 10 ml. of ether, is stirred at room temperature while a solution of 2.17 g. (0.01 mole) of 4-(phenylethynyl)phenylacetonitrile in 15 ml. of ether is added dropwise. The mixture is refluxed for 4 hours, and then is cooled in an ice-salt bath while a solution of 1.43 g. (0.01 mole) of 1-bromo-2-chloroethane in 2 ml. of ether is added dropwise. The mixture is stirred overnight at room temperature, refluxed for 4 hours, cooled, and diluted with 20 ml. of water. The aqueous phase is separated, re-extracted with ether, and the combined organic phases are washed with water and dried over magnesium sulfate. The oily solid residue obtained by evaporation of the ether is freed from oil by trituration with ether and sublimed at 80° (0.5 mm) to yield 1.28 g. (53%) of 1-[4-(phenylethynyl)phenyl]cyclopropane carbonitrile, m.p. 93°–95°C.

Anal. Calc'd for $C_{18}H_{13}N$:Cm 88.86; H, 5.39; N.576. Found: C, 88.99; H, 5.55; N, 5.52.

C. 1-[4-(Phenylethynyl)phenyl]cyclopropane carboxamide

A mixture of 3.49 g (0.014 mole) of 1-[4-phenylethynyl)phenyl]cyclopropane carbonitile, 20 drops of 25% potassium hydroxide, 18 ml. of 30% hydrogen peroxide, and 140 ml. of methanol is heated at 55°–60° for 8 hours, with additions of 10 ml. of 30% hydrogen peroxide and 10 drops of 25% potassium hydroxide after 4.5 hours and 5 ml. of 30% hydrogen peroxide after 6 hours. The product crystallization from benzene-cyclohexane gives pure 1-[4-(phenylethynyl)phenyl]cyclopropane carboxamide, m.p. 174°–175.5°.

Anal. Calc'd for $C_{17}H_{15}NO$:C, 82.73; H, 5.78; N, 5.36. Found: C, 83.07; H, 5.91; N, 5.32.

D. 1-[4-(Phenylethynyl)phenyl]cyclopropane carboxylic acid

A mixture of 2.92 g. (0.0112 mole) of 1-[4-(phenylethynyl)phenyl]cyclopropane carboxamide, 90 ml. of methanol, 90 ml. of tetrahydrofuran, and 60 ml. of 10% sodium hydroxide is refluxed for 66 hours. After removing solvents, the sodium salt is collected and washed with water and methylene chloride. The precipitate is stirred in a mixture of 6N hydrochloric acid and methylene chloride untill all the solid is dissolved. The organic phase is removed, washed with water, dried ($MgSO_4$), filtered, and the solvent removed to give 1.95 g. (66%) of 1-[4-(phenylethynyl)phenyl]-cyclopropane carboxylic acid, m.p. 214°–218°. The product is recrystallized from benzene-cyclohexane, m.p. 215°–218°.

Anal. Calc'd for $C_{18}H_{14}O_2$:C, 82.42; H, 5.38. Found: C, 82.36; H, 5.37.

E. 1-[4-(Phenylethynyl)phenyl]cyclopropylamine.

To a stirred suspension of 2.52 g. (0.0096 mole) of 1-[4-(phenylethynyl)phenyl]cyclopropane carboxylic acid in 12 ml. of acetone - 2 ml. of water, cooled in an ice-salt bath, is added dropwise a solution of 1.13 g. (0.0112 mole) of triethylamine in 9.5 ml. of acetone followed by a solution of 1.31 g. (0.012 mole) of ethyl chloroformate in 5.5 ml. of acetone. After stirring for 0.5 hours, a solution of 0.94 g (0.0145 mole) of sodium azide in 3 ml. of water is added. After stirring for one hour, the mixture is poured into 80 ml. of water and the azide is extracted into toluene. The water washed and magnesium sulfate dried toluene extract is heated for 0.5 hour on a steam bath, evaporated to about 15 ml. and benzyl alcohol (2 ml.) is added. The mixture is heated for 6 hours on the steam bath and if filtered hot. N-Benzyloxycarbonyl-1-[4-(phenylethynyl)phenyl]cyclopropylamine, 2.9 g. (82%) precipitated from the cooled filtrate. The material is recrystallized from benzene-hexane and from isopropyl alcohol, m.-. 171°–173°.

Anal. Calc'd for $C_{25}H_{21}NO_2$: C, 81.72; H, 5.76; H, 3.81.

Found: C, 81.72; H, 5.81; N, 3.76.

A solution of the above benzylurethane (1.0 g., 0.0027 mole) and 8 g. of potassium hydroxide in 40 ml. of n-butanol is heated at 115°–120° for 7 hours, cooled, and poured into 250 ml. of water. The aqueous layer is separated and extracted with benzene. The combined organic phases are washed with water and extracted with 0.5 M citric acid. Neutralization of the acid extract with 40% sodium hydroxide precipitated 0.51 g. (80%) of 1-[4-(phenylethynyl)phenyl]-cyclopropylamine as white crystals, m.p. 112°–116°. The product is recrystallized from hexane, m.p. 117°–118°.

Anal. Calc'd. for $C_{17}H_{15}N$: C, 87.51; H, 6.48; N, 6.00. Found: C, 87.27; H, 6.44; N, 6.12.

Corresponding cyclopropylamines are prepared when the following benzyl alcohols are substituted for the 4-(phenylethynyl)benzyl alcohol in the Example 1 procedure:

4-(3-cyclohexylphenylethynyl)benzylalcohol,
4-(2,4-xylylethynyl)benzyl alcohol,
4-(4-t-butylphenylethynyl)benzyl alcohol,
4-(3-ethoxyphenylethynyl)benzyl alcohol,
4-(3,5-dibromophenylethynyl)benzyl alcohol
4-(diphenylylethynyl)benzyl alcohol and the like.

The N-mono- and N,N-dialkyl substituted derivatives of these cyclopropylamines are prepared by available alkylation methods, e.g. treatment with formaldehyde and HCOOH or acylation of the amine followed by reduction.

Another method for preparing the present cycloalkylamines is illustrated by the following reaction sequence:

REACTION SEQUENCE B

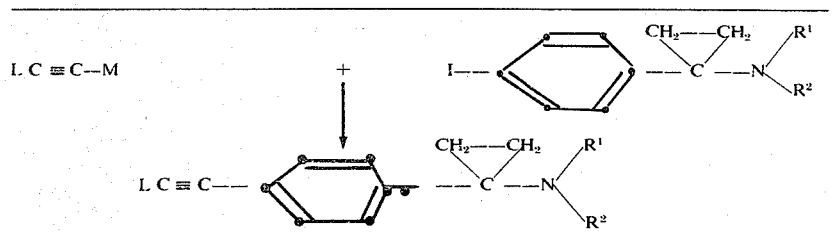

The reaction sequence utilizes an aryl metal acetylide and a suitable aryl iodide to prepare the amine compounds directly. M in the above equation may be Ag or Cu while L, $R^1$ and $R^2$ are as defined above. A most suitable acetylide is the cuprous acetylide

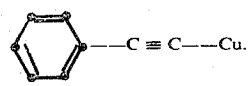

The compounds of the present invention, both the free amines and their pharmaceutically acceptable salts, are pharmacologically active in inhibiting monomaine oxidase. This activity was demonstrated by determining the effect of an amine of the present invention on brain serotonin. The following test procedure was used:

Female albino mice were given (interperitoneally) single dose of 1-[4-(phenylethynyl)phenyl]cyclopropylamine (150 mg./kg.). After 90 minutes, the mice were sacrificed and the brains were removed immediately. Five pools of four brains each from treated and untreated mice were assayed for serotonin by the general method discribed in J. Biol. Chem. 215, 337 (1955), with the single exception that three extractions with 25 ml. of heptane were carried out immediately prior to butanol extraction in order to remove interfering drug. The results of the test are tabulated below.

TABLE 1

Determination of MAO Inhibition by Serotonin Level

| Test | Animal Treatment | Serotonin Level ($\mu$/g.) |
|---|---|---|
| 1 | none | 0.75 |
| 2 | 150 mg./kg. of Example 1 compound | 1.41 |

The data shows that the serotonin level of the mice treated with an amine of the present invention was substantially increased. Since inhibition of monoamine oxidase is known to effect an increase in serotonin level, the data in Table 1 clearly indicates that the Example 1 compound is a monoamine oxidase inhibitor.

In addition to the in vivo MAO inhibition demonstrated by the Example 1 compound, comparable in vitro MAO inhibition by the Example 1 compound was also observed.

Analogous MAO inhibition is effected by any of the cyclopropylamines (and/or salts thereof) disclosed herein.

Since it is recognized that an increase in serotonin level by MAO inhibition stimulates the central nervous system, MAO inhibitors have found use in treatment of patients suffering from mental depression. The amount of MAO inhibitor compounds to be used in treating mental depression will vary, depending on the severity of the depression, the physical condition of the patient, the relative activity of the compound used, the mode of administration and other factors. Generally, daily doses ranging from 0.01 to 15 mg. per kilograms can be used. The compounds of the present invention can be administered by any suitable mode such as orally, intravenously, intraperitoneally etc. Suitable dosage forms are used depending on the mode of administration. The compounds of the present invention can be administered as the free amines or preferably as pharmaceutically acceptable salts. For oral administration, the compounds can be used in tablets, capsules, microcapsules, in palatable liquid carriers and the like. For administration by injection, the compounds can be conveniently dissolved or dispersed in a pharmaceutically acceptable carrier.

Claims to the invention follow:

What is claimed is:

1. Compounds selected from a. substituted cyclopropylamines having the formula:

wherein L is aryl, and $R^1$ and $R^2$ are or each hydrogen, alkyl alkenyl, and b. non-toxic, pharmaceutically acceptable salts of (a).

2. Compounds of claim 1 wherein L is phenyl or substituted phenyl.

3. Compounds of claim 1 wherein L is phenyl.

4. Compounds of claim 3 wherein $R^1$ and $R^2$ are each hydrogen or $C_1 - C_6$ alkyl.

5. Compounds of claim 4 wherein $R^1$ and $R^2$ are each hydrogen.

6. A process for preparing compounds having the formula:

wherein L is aryl, and $R_1$ and $R_2$ are each hydrogen, alkyl, or alkenyl, which comprises reacting an iodo compound having the formula:

with an acetylide having the formula:

wherein M is Ag or Cu.

7. The process of claim 6 wherein L is phenyl or substituted phenyl and M is Cu.

8. The process of claim 7 wherein L is phenyl.

9. The process of claim 8 wherein $R^1$ and $R^2$ are each hydrogen or $C_1 - C_6$ alkyl.

10. The process of claim 9 wherein $R^1$ and $R^2$ are each hydrogen.

11. A process for preparing compounds having the formula

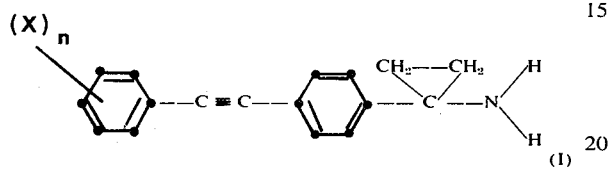

wherein X in independently selected from halogen, alkyl, phenyl, hydroxy, alkoxy, cycloalkyl, and —$CF_3$, n is selected from 0, 1 and 2 which comprises:

(1) treating a compound having the formula:

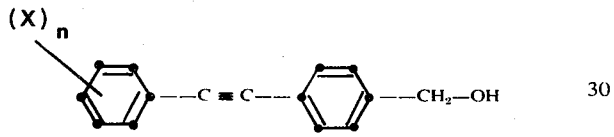

with a chlorinating agent to produce the chloro compound

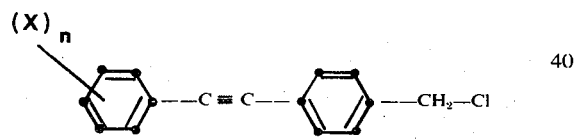

(2) treating said chloro compound with a suitable cyanide reagent to prepare the corresponding cyano compound having the formula

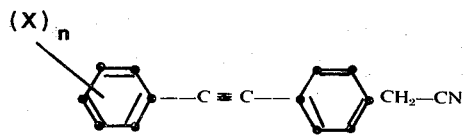

(3) treating said cyano compound with sodamide and 1-bromo-2-chloroethane to produce a cyclopropyl cyano compound having the formula:

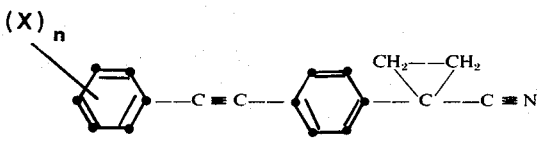

(4) hydrolyzing said cyclopropylcyano compound to produce the corresponding carboxylic acid having the formula:

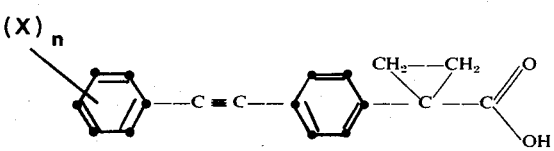

(5) converting said carboxylic acid to the corresponding azide, (6) rearranging said azide by heating in a suitable solvent, and (7) hydrolyzing the product from (6) to produce said formula(I)amine.

12. The method of claim 11 wherein $n$ is 0, and $R^1$ and $R^2$ are each hydrogen and in step (1) said chlorinating agent is $SOCl_2$, in step (2) said cyanide reagent is NaCN, and in step (6) said solvent is benzyl alcohol, the product obtained having the formula:

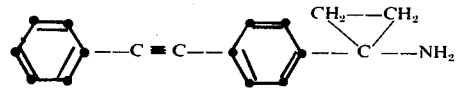

13. A process for preparing salts of compound having the formula

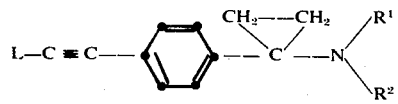

wherein L, $R^1$ and $R^2$ are as defined in claim 1, and said compound has one or more basic amine nitrogens, which comprises treating said compound with sufficient inorganic or organic acid to neutralize at least one of said basic amine nitrogens.

* * * * *

UNITED STATES PATENT OFFICE
CERTIFICATE OF CORRECTION

PATENT NO. : 3,903,165
DATED : September 2, 1975
INVENTOR(S) : David C. Remy

It is certified that error appears in the above-identified patent and that said Letters Patent are hereby corrected as shown below:

In Column 10, Claim 1, line 40 should read:

wherein L is aryl, and $R^1$ and $R^2$ are each hydrogen,

In Column 10, Claim 1, line 41 should read:

alkyl or alkenyl, and

Signed and Sealed this second Day of December 1975

[SEAL]

Attest:

RUTH C. MASON
Attesting Officer

C. MARSHALL DANN
Commissioner of Patents and Trademarks